March 6, 1956  E. E. SIMMONS, JR  2,737,256
ACOUSTIC PULSE DETECTOR
Filed June 13, 1949
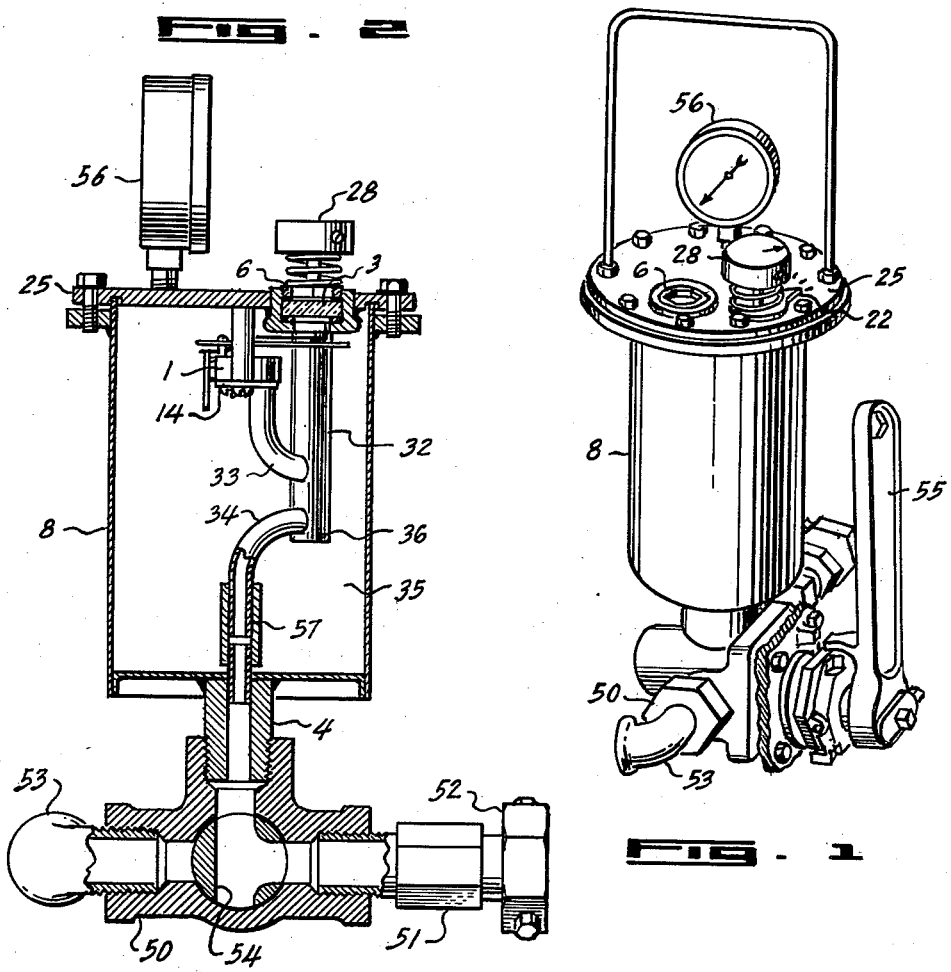
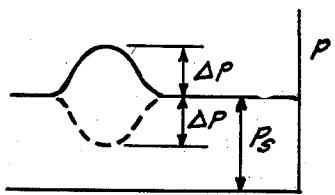
INVENTOR:
Edward E. Simmons, Jr.

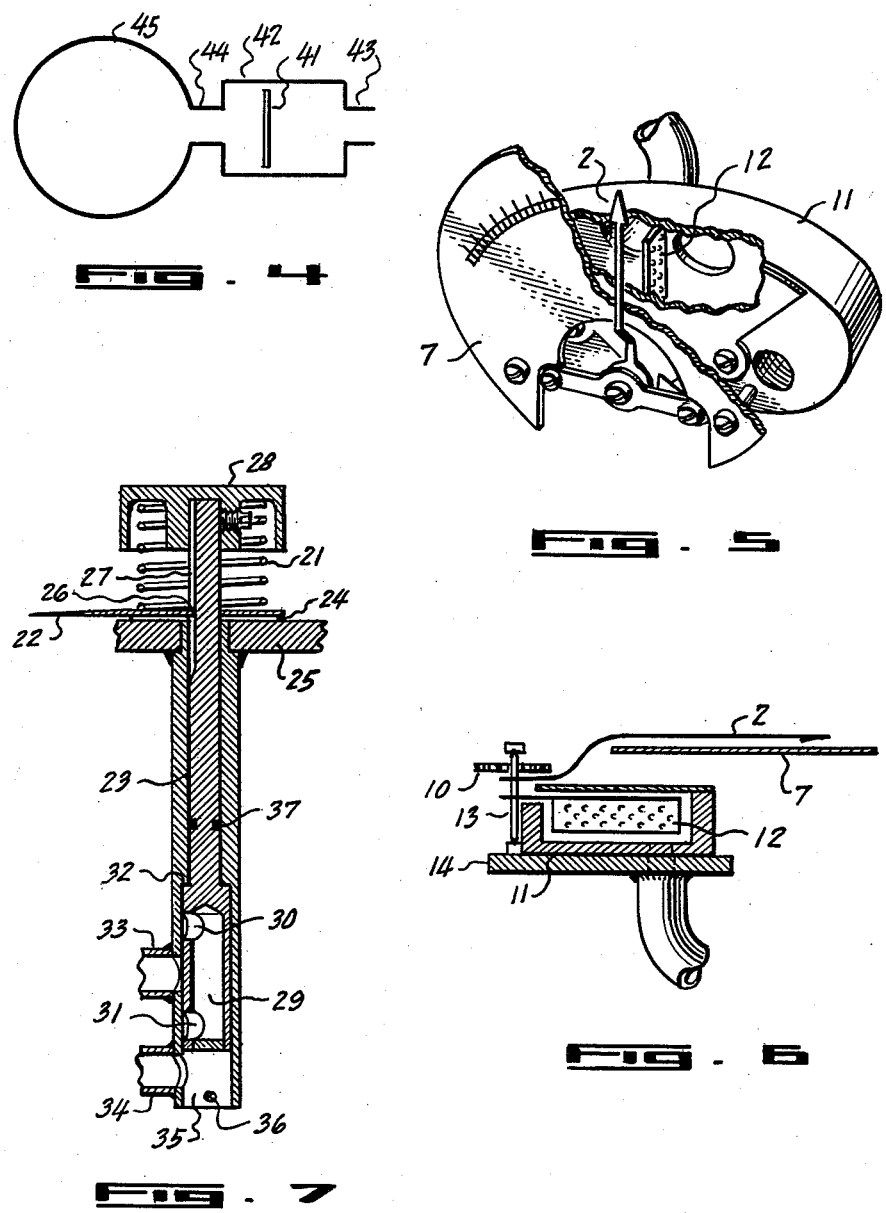

United States Patent Office 2,737,256
Patented Mar. 6, 1956

2,737,256
ACOUSTIC PULSE DETECTOR
Edward E. Simmons, Jr., Pasadena, Calif.

Application July 13, 1949, Serial No. 104,621

8 Claims. (Cl. 181—.5)

This invention relates to a device for detecting acoustic pulses. It is particularly useful in the detection of echoes from obstructions in long tubes in pulse echo ranging. The invention is useful in the determination of the depth, the fluid depth, or the depth to obstructions in both water and petroleum wells. Another feature of this invention is the improvement in apparatus and methods both in the production of acoustic pulses and the detection of acoustic pulses for the objects stated above.

The method of acoustic ranging in all kinds of transmission systems including wells is well known in the art. Illustrating the prior art are the following patents: 602,422; 1,217,585; 1,240,328; 1,351,356; 1,649,378; 1,671,262; 1,730,411; 2,047,974; 2,116,523; 2,173,426; 2,201,311; 1,847,636; 2,008,934; 2,021,744; 2,156,519; 2,209,944; Re. 21,383.

In the practice of acoustic ranging in tubes such as wells, a pulse is produced at the well head by any of the several methods cited above. Using the well known relations between distance, velocity and time, the distance to an obstruction is determined using the echo return time interval. Several commercial acoustic ranging systems for well sounding are in current use and are well known in the petroleum trade. Among these are the "Depthograph," the "Echo Meter" and the "Sonolog." These are elaborate systems employing considerable apparatus and are generally operated only by specialists.

One object of the present invention is to make possible a simple rugged and easily portable well sounding apparatus capable of operation by ordinary petroleum field labor. Whereas much of the present petroleum well sounding is limited to urgent situations because of the cost of providing the elaborate apparatus and service, the present invention provides an inexpensive apparatus which can be operated by the local field crew. Thus desirable information on performance of petroleum wells in the form of fluid level information is not suppressed by aspects of cost.

The drawings illustrate the structure of the invention. Fig. 1 is a complete assembly of a well sounding apparatus incorporating the invention. Fig. 2 is a section of Fig. 1. Fig. 3 is a graphic representation of an acoustic pulse. Fig. 4 shows an elementary schematic of the pulse detecting system. Fig. 5 is a view of a pivoted vane detector element with parts broken away. Fig. 6 is a sectional view of the element of Fig. 5. Fig. 7 is a cross-sectional view of the sensitivity adjusting valve in Fig. 2.

One of the objects of this invention is to provide a simple fluid pulse detector element. Fig. 3 represents on a pressure time graph the feature of a fluid pulse. As time is started to be measured the pressure in a body at the fluid is the static pressure P$s$. At some time, there is a change in the value of the fluid pressure to another value such as P$s$ plus or minus delta P. It is evident that delta P can be positive or negative. For the purposes of description delta P will be assumed positive without limiting the description to this type of pulse. At a later time the fluid pressure returns again to a steady value. Fig. 4 shows an elementary form of the pulse detector covered by this invention. At 41, a vane is suspended in a vessel 42 with inlet 43 and outlet 44. At 45 a closed vessel is connected to outlet 44. The system at Fig. 4 is subject to the static pressure P. Now if a pulse delta P is superimposed on P, the force on the vane 41, due to fluid pressure will be higher on the inlet side. The vane will then be displaced until the pressure on the outlet side of vessel 42 and in vessel 45 shall become equal to the inlet pressure. It is evident that the larger the volume on the vessel 45 side of the vane the more the vane must move for a given delta P or conversely the smaller the delta P required to produce a given vane deflection. Now when the pulse has passed at the inlet 43 and the inlet pressure returns to the steady value P, the compressed fluid in the vessel 45 side of the vane must expand back to the initial value at pressure P, thus displacing the vane in the reverse direction. Thus the instantaneous position of vane 41 during the passing of a pulse in the fluid pressure is a function of the instantaneous pulse pressure. If the vane has clearance around its edge, as it must, or passages at any other point, part of the fluid will flow through such passages and the magnitude of the displacement reduced. It will be apparent that vane 41 may be constructed so as to have one of several modes of movement, each utilizing appropriate restraining mechanisms. Longitudinal movement with a helical spring for restoration is one example. Pivotal movement with either an elastic hinge, gravity, magnetic attraction or a spiral spring are other examples, the latter being later illustrated in Fig. 5. Another arrangement would be to construct a spherical vane and position it in a conical tube or tube whose clearance space varies with the height. In this arrangement, fluid is caused to flow through the tube at a steady rate to produce support for the moving member at a fixed point. A valve could then be used to permit adjustment of this flow. A pulse in the flow pressure would cause the spherical vane member to move just as described above. The steady flow of fluid serves only to support the vane and does not appreciably affect the pulse detecting performance of the system.

A desirable feature for some of these systems is the use of the compression or surge chamber, which must be designed to withstand the total fluid pressure, as a container for the pulse sensing element. Fig. 2 shows such an arrangement. The pivoted vane type of element is shown at 1 with the attached indicating pointer 2 which is viewed through a strong pressure resisting transparent window 3. Inlet pressure connection is made through a plug 4 in the bottom of the pressure vessel. In this way the pulse detecting elements need not stand high fluid pressures while the surge vessel can easily be built to withstand the necessary pressure as its shape need only be that of good pressure vessel design.

Another object of this invention is to provide simple mechanism for permitting the observation of the motion of the pulse sensitive vain from the outside of a pressure resisting container. In one arrangement as illustrated in Fig. 1, Fig. 2, a strong pressure resisting, transparent window 3 is provided with a resilient gland 5 and a screwed retaining ring 6. This window may be formed from the well known sight glass of the refrigeration trade. Mounted as shown in Fig. 2, the sensitive pivoted vane element 1, has its indicator hand 2 and reference scale 7 located so that the motion at the indicator over the scale may be observed from the outside through the window. The construction of this particular vane type element is shown in detail in Fig. 5 and Fig. 6. In the particular apparatus of Fig. 2, the vane element was adapted from a well known moving iron vane miniature electric meter movement. The plastic case 11 of Fig. 5 is the air damping chamber of said electrical instrument and the vane 12 is the light aluminum damping vane working in a sector shaped case without contact at its edges of said electrical instrument. The vane 12 and indicator hand 2 are mounted on a pivoted shaft 13 along with a spiral centering spring 10, Fig. 6. A scale 7 is mounted as shown in Fig. 5. The electric coil normally associated with the electrical instrument was removed. Two holes are bored in the back of the plastic case symmetrically about its center so as to leave a land space of about 3/16 inch between the holes. These holes line up and connect with similar holes in the support plate 14, Fig. 2 and Fig. 6. One hole communicates directly to the inside of the cylindrical case 8, Fig. 2. The other hole communicates with a pipe which in turn connects to a control valve and through this valve to the inlet plug 4. Thus is provided a system of a moving vane connected to a pointer moving over a scale with the pointer and scale being visible from the outside through the window.

Another object of this invention is to provide a novel valve for protecting the sensitive element from blast damage and for adjusting the sensitivity of the pulse detector during operation. Fig. 7 shows a cross section of one form of said valve. The movable member of the valve 23, Fig. 7, is arranged so as to move longitudinally as well as in rotation. A spring 21 holds the valve in the normal position as shown in Fig. 7. The valve pointer 22 is also held down against the friction washer of leather or composition 24, which in turn rests on the mounting plate 25. The pointer is slidably mounted on the moving member stem but locked as to rotation by a key nib 26 which slides in a keyway 27 of said stem. A knob 28 retains the spring on said stem and provides an operating handle. The lower portion of the moving member 23 contains a hollow space or passage 29 which communicates to two ports 30 and 31, which in the normal position are blocked against the valve case 32 in its cylindrical bore. Also in the normal position the outlet port 33 is blocked against the cylindrical surface of the moving member 23. In the normal position port 34 is open to the open end 35 of the valve case. If the movable member is moved down to the end of its stroke as limited by pin 36 and rotated for alignment of port 30 with port 33 and port 31 with port 34, then an exclusive passage is formed between inlet port 34 through the passage 29 to outlet port 33. If the moving member is continued to be held down and rotated from the position above, the two sets of mating ports can be progressively reduced in passage area in the well known manner of a cock valve until there is a complete shut off between inlet 34 and outlet 33. Intermediate values of rotation produce continuous control of construction of two cock type constructions in series from full open to shut off for a rotation of approximately 90 degrees. The degree of construction is indicated by the position of the keyed pointer 22 against a scale on the mounting plate 25 as shown in Fig. 1. A resilient gland 37, Fig. 7, seals the valve stem against leakage as is well known in O ring practice. Port 33 communicates to the sensitive element 1, port 34 communicates with the pulse detector inlet 4 and port 35 communicates to the interior of the surge chamber 8 as illustrated in Fig. 2. In addition to the advantages cited above, this valve arrangement prevents dirt and liquids from reaching the sensitive element when changing the instrument. Any such foreign material which may be blown in while pressurizing the instrument is blown through the valve by way of port 34 to port 35 and into the surge chamber but not inside the vane element 1, Fig. 2.

Another object of this invention is to provide a simple and effective apparatus for both producing acoustic pulses and switching the necessary connections in the process of acoustic ranging in tubes. Fig. 2 shows the valve layout for this system. At 50 is a 3-way 3-port cock type of valve such as a Nordstrom 3412 multiport valve. The pulse detector assembly is attached to the side connection of said valve at 4. A nipple 51 and a union 52 attaches to one through connection of the valve so as to provide a connection to a tube in which sound ranging is desired, as for instance, an oil well where the union connects to an outlet at the well head. At 53 an L provides an exhaust deflector or a connection for an impulse chamber at the other through connection of the valve 50. Refer to Lehr and Wyatt, U. S. Patent 2,047,974 for detailed methods of producing acoustic pulses in wells.

The moving member of valve 50 is 54, Fig. 2. and is connected to the operating handle 55, Fig. 1. The position of said valve, as shown in Fig. 2, corresponds to the vertical position of the handle 55 in Fig. 1. In this position the well communicates to the pulse detector assembly through plug 4 to port 34, through port 35 to the interior of the surge chamber 8, Fig. 2. Thus the well static pressure is transmitted to the surge chamber and equalized with the well head pressure. Note that during this changing the sensitive element is cut out through the operation of the control valve 32, Fig. 2. Now to produce an acoustic pulse in the well, the valve handle 55, Fig. 1, is moved clockwise to engage the outlet 53 with the valve 50 inlet, thus keeping the strong pressure surge out of said detector. After a quantity of gas is discharged from the well in order to produce a well pulse the handle 55 is returned to the normal vertical position. Now the pulse detector assembly is in communication with the well head but the sensitive element 1, Fig. 2, is cut off by the valve 32. To detect returning echoes the control handle 28 is depressed thus inserting the sensitive vane 12, Fig. 5 between the well head and the surge chamber 8. The fluctuation of the well head pressure occasioned by the arrival of echoes of the pulse causes the vane to be deflected as explained above. By watching the deflection of the indicator pointer 2 through the window 3 of Fig. 2, the time of arrival of a pulse echo from a well obstruction or fluid surface can be observed. The handle 28 can be rotated to adjust the sensitivity of the instrument to produce a desired deflection of the pointer 2, Fig. 2, in response to echoes received.

In a typical measurement, the pulse detector assembly is attached to the outlet of the well head valve of a petroleum well with the union connection. With the handle 55 in the vertical position the well head valve (not illustrated but well known in the petroleum trade) is opened to permit charging the instrument with well pressure. The pressure gage 56, Fig. 2, indicates the well pressure and serves as a warning against over pressuring of the instrument beyond its safe working pressure by high pressure wells. In the instrument shown as an example, the working pressure as limited by the strength of the case 8 is 250 p. s. i. Higher working pressures are obviously only limited by the design of the case 8, window 3 and the valve 50, Fig. 2.

Next, the valve handle is quickly pushed forward and returned to liberate a burst of gas from the well in order to produce an acoustic pulse in the well. At the same instant a stop watch is started. Now the handle 28, Fig. 2, is depressed and when the returning pulse echo from the well fluid level arrives and deflects the pointer 2, Fig. 2, the stop watch is stopped. If the pointer deflection is too small or two large, rotation of handle 28 permits adjustment of said deflection according to well conditions. The depth of the fluid level in a well is computed in the well known way from the velocity of sound in the well and the time interval of the echo.

Another object of this invention is to provide a moving vane puse sensitive element whose design provides protection against damage by the application of high amplitude or overloading pulses to said element. It will be noted in the elementary representations of the vane elements in Fig. 4, the moving member, in the case of overloading pulsing, would be driven violently against the case. It is evident that the delicate vanes required to detect weak acoustic pulses would be damaged easily by overloading. In the form shown in Fig. 5 the pointer or pivots could be damaged by such violent impact of the vane on the case. In Fig. 5 one arrangement of a construction which protects the element against overloading pulse damage is shown. Here the inlet and outlet ports in the case are located inwards from the case sides so as to provide a cushioning space in the vane case at both ends of the vane travel. In this arrangement a heavy pulse drives the vane over until it uncovers the exhaust port, thus allowing the pulse to relieve itself from one port to the other with the vane out of the way. The vane in being over past a port encounters trapped gas in the space in the case beyond the port and is slowed to stop without impact on the case. In addition there is an aerodynamic flow of the gas out the exhaust port which further restrains the vane from passing beyond the area of the port in a gentle elastic manner. In practice it is almost impossible to drive the vane against the case by any kind of high amplitude pulse applied to one of the ports. The position of the ports as illustrated in Fig. 5 is not the only position in which the above effect can be obtained. It is evident the positioning of the ports anywhere on the case so as to obtain a trapping volume in the case and/or provide for the vane passing over the area of the ports will be suitable for the obtaining of the above vane protecting effect.

Another object of this invention is to provide a construction to permit easy assembly and disassembly of an instrument contained in a two part vessel where there is a pressure tap connection on one part and an instrument assembly on the other part. In Fig. 2 the sensitive element, glass window, control valve and pressure gage are mounted on a flange plate. The inlet connection 4 is part of the cylindrical surge chamber container 8. In order to provide easy connection between the two parts for the pressure lead line a sleeve 57 in which the tubes to be connected can slide with a substantially pressure-tight fit. The sleeve can be attached to either tube end or not attached to either. In the assembly of Fig. 2 in practice the sleeve is a piece of an elastic material in one case of rubber tubing. With these arrangements the making of the connections between the pulse sensing element and the connection plug is easily made by aligning the tube ends and then making up the case connections.

It is evident that if the body of gas subject to pulse changes in pressure is at substantially atmospheric pressure, the surge chamber such as 5, Fig. 4, is unnecessary because there would be no steady flow of gas that would disturb the moving member of the pulse sensitive elements described above. Essentially the earth's atmosphere serves as the surge chamber. In some wells, especially water wells, the pressure in the well is substantially atmospheric. Here a simpler apparatus is possible as there is no pressure resisting requirement and no surge chamber is needed. Such apparatus is illustrated in Fig. 14. One side of the vane is in communication with the well head which must be relatively tight so that the acoustic pulses will be sufficiently diverted into the pulse sensitive element. The other side of the vane is in communication with the earth's atmosphere. Fig. 14 at 1 shows an impulse generator which could be Lehr and Wyatt's impulse chamber of Patent 2,047,974 or other prior art methods of producing acoustic pulses not dependent upon gas pressure in the well. A moving member pulse sensitive element is shown at 2 and 3. Thus for example, in a water well a blast of gas is delivered into the well by the impulse generator 1 to provide an acoustic pulse. This pulse upon being returned as an echo from the water level or other obstruction would enter the sensitive element 2 and produce a motion of the moving member to indicate the arrival of the echo pulse thereby allowing the calculation of the depth to the water.

I claim:

1. An acoustic pulse detector system for detecting return pulses in a first fluid medium, said system comprising: means having a second fluid medium; means for producing an acoustic pulse; actuable means for normally fluid coupling said second and the first fluid mediums, said actuable means being operable when actuated for uncoupling the first and second fluid mediums and coupling said pulse producing means to the first fluid medium whereby an acoustic pulse is transmitted in the first fluid medium; a differential pressure indicator device; and selectively actuable valve means operable when actuated for fluid coupling said differential pressure indicator device between the first and second fluid mediums whereby return pulses appearing in the first fluid medium are indicated by said indicator device.

2. The system of claim 1 wherein said differential pressure indicator device includes a pivoted vane, said pivoted vane being directly interposed between the first and said second fluid mediums when said selectively actuable valve means is actuated and undergoing pivotal movement in response to said return pulses.

3. The system of claim 2 wherein said differential pressure indicator device includes, in addition, pointer means coupled to said pivoted vane, and a scale adjacent said pointer means whereby the magnitude of the pivotal movement may be observed.

4. The system of claim 3 wherein said selectively actuable valve means includes selectively adjustable means for varying the amount of fluid coupling between the first and said second fluid mediums when said valve means is actuated.

5. The system of claim 4 wherein said valve means includes, in addition, scale means for indicating the amount of said fluid coupling as determined by the adjustment of said selectively adjustable means.

6. A device for detecting acoustical pulses in a first fluid medium under a given pressure, said device comprising: means for selectively introducing a pulse into the first fluid medium; a housing having a chamber; second means for placing the chamber of said housing under said given pressure; a differential pressure indicating device having a pair of input fluid connectors, said indicating device indicating difference in pressure between said input fluid connectors; means for fluid coupling one of said input fluid connectors directly to said chamber; and selectively actuable valve means normally disconnecting the first fluid medium and the other of said input fluid connectors, said valve means being operable when actuated for directly coupling the first fluid medium to said other input connector whereby said indicating device indicates a return acoustical pulse appearing in said first fluid medium when said valve means is actuated only after the first-named means introduces a pulse in the first fluid medium.

7. The device of claim 6 wherein said differential pressure indicating device includes a case, a pivoted vane within said case, torquing means associated with said pivoted vane for establishing a normal position of said vane, said pair of input fluid connectors lying on either side of the normal position of said vane whereby pulses appearing from said first fluid medium when said valve means is actuated deflects said vane to indicate said pulse.

8. An acoustic pulse detector system for detecting pulses in a well, said system comprising: a housing having a chamber; selectively actuable valve means having input and output fluid connections and an outlet port, said valve means normally making a fluid connection between said input connection and said outlet port but operable when actuated for making a fluid connection only between said input and output connections; said outlet port being in fluid connection with said chamber whereby said input connection and said chamber are normally in fluid communication; means for producing an acoustic pulse; three way valve means for selectively coupling either said acoustic pulse producing means or said input connection to said well whereby either an acoustic pulse is transmitted into said well or a return pulse is transmitted into said input connection, respectively; a differential pressure indicating device having a pair of input fluid connectors, said indicating device indicating a difference in pressure between said input fluid connectors; means for fluid coupling one of said input fluid connectors to said chamber; and means for fluid coupling the other of said input fluid connectors to the output fluid connection of said selectively actuable valve means whereby the return pulses in the well are indicated by said indicating device.

References Cited in the file of this patent

UNITED STATES PATENTS

| Number | Name | Date |
|---|---|---|
| 742,099 | Thompson | Oct. 20, 1903 |
| 828,108 | Graham | Aug. 7, 1906 |
| 931,348 | Schulz | Aug. 17, 1909 |
| 1,038,155 | Koehler | Sept. 10, 1912 |
| 1,200,640 | Morris | Oct. 10, 1916 |
| 1,249,484 | Pogue | Dec. 11, 1917 |
| 1,504,770 | Lieber | Aug. 12, 1924 |
| 1,574,460 | Williamson | Feb. 23, 1926 |
| 1,924,091 | Eisenhour | Aug. 29, 1933 |
| 1,992,991 | Colley | Mar. 5, 1935 |
| 2,008,934 | Smith | July 23, 1935 |
| 2,043,984 | Alder | June 16, 1936 |
| 2,047,974 | Lehr | July 21, 1936 |
| 2,055,713 | Alder | Sept. 29, 1936 |
| 2,060,009 | Alder | Nov. 10, 1936 |
| 2,060,848 | Boyle | Nov. 17, 1936 |
| 2,081,981 | Bradshaw | June 1, 1937 |
| 2,112,570 | Spacher | Mar. 29, 1938 |
| 2,150,836 | Lamb | Mar. 14, 1939 |
| 2,211,196 | Bristow | Aug. 13, 1940 |
| 2,268,391 | Gauthier | Dec. 30, 1941 |
| 2,274,086 | Morrison | Feb. 24, 1942 |
| 2,281,751 | Cloud | May 5, 1942 |
| 2,396,935 | Walstrom | Mar. 19, 1946 |
| 2,461,351 | Silverman | Feb. 8, 1949 |
| 2,531,844 | Fiedler | Nov. 28, 1950 |
| 2,559,402 | Comstock | July 3, 1951 |

FOREIGN PATENTS

| Number | Country | Date |
|---|---|---|
| 320,172 | France | Apr. 3, 1902 |